Patented Jan. 2, 1934

1,942,146

UNITED STATES PATENT OFFICE 1,942,146

IMPREGNATED AND SUPERFICIALLY SMOOTHED ARTICLE

Leo Kollek and Wilhelm Engels, Ludwigshafen-on-the-Rhine, Germany, assignors to I. G. Farbenindustrie Aktiengesellschaft, Frankfort-on-the-Main, Germany No Drawing. Application December 4, 1930, Serial No. 499,970, and in Germany December 19, 1929

12 Claims. (Cl. 91—68)

The present invention relates to impregnated and superficially smoothed articles.

We have found that valuable impregnated and superficially smoothed articles can be obtained by treating organic articles with an uneven surface such as leather and cellulosic materials, such as porous or rough wood, paper, textiles and the like with one or more from viscous liquid to solid waxy polymerization products of alkylene oxides or pastes, solutions or emulsions containing the same, if desired with the addition of other impregnating or pore-filling organic film-forming agents, such as waxes, resins, cellulose derivatives, condensation products of urea or its derivatives and formaldehyde, or of phenols and aldehydes, or of polyhydric alcohols and polybasic acids, or of vinyl compounds. For the sake of brevity the aforesaid polymerization products of alkylene oxides will be referred to in the following and in the claims as "viscoid" polymerization products which term is meant to comprise the polymerization products of alkylene oxides which are viscous at room temperature as well as those which are more or less solid at the said temperature and become viscous liquids on heating, in contradistinction to dioxane which is a thin liquid at room temperature and readily crystallizes on cooling to about 8° C.

The said viscoid polymerization products of alkylene oxides can be obtained for example by means of caustic alkalies, alkali metals, metal or metaloid halides or organic bases, and/or by the action of heat or by other similar methods of polymerization, and are liquid or solid. Thus the polymerization products of ethylene oxide of a low degree of polymerization are viscous liquids, while those of a higher degree are solid. The solid polymerization products of alkylene oxides partly exhibit a touch and appearance similar to those of from soft to hard paraffin wax.

The polymerization products from ethylene oxide are more or less readily soluble in water and in many organic solvents as for example in methyl alcohol, ethyl alcohol, acetone, ethyl acetate, methylene chloride, chloroform, butyl acetate, ethers of glycols, cyclohexanone, benzyl alcohol and the like, whereas the polymerization products of propylene and higher oxides are soluble only in organic solvents or concentrated aqueous solutions thereof. On account of the good solvent power for many organic substances as for example for waxes, wax-like substances such as bleached montan wax, colophony, Manilla copal, Kauri copal, mastic, artificial resins, fats, oils, such as castor oil, esters of phthalic, tartaric or phosphoric acids and like impregnating or smoothing agents, homogeneous solutions of the aforesaid agents may be obtained, which are suitable for a thorough and uniform impregnating or polishing, coloring materials such as pigments or dyestuffs being incorporated, if desired as well as fillers, such as heavy spar, zinc white, lithopone, iron oxides, ochre and the like. In spite of the good solubility in water of many of the said polymerization products, impregnations having good stability to water may be prepared therewith. The impregnating or polishing may be effected for example by heating the polymerization products if they be not of viscous liquid nature or of a too high viscosity or by dissolving them in, or making them into a paste with, water or in another solvent, the article to be impregnated or polished then being dipped in or covered with the oil, melt or solution or rubbed with the solution. Since the polymerization products do not retain organic solvents for a long period of time, as is the case with natural waxes, easily volatile solvents, such as ethyl alcohol, acetone or hydrocarbons of the benzene series may be employed whereby quickly drying preparations are obtained. The articles impregnated or polished with the alkylene oxide polymerization products or preparations containing a considerable proportion thereof, even with the solid polymerization products, remain clear even if a sensitive wooden surface be treated, the pores are uniformly filled and the filler does not shrink, so that the smoothed surfaces may be provided with a superficial varnish coating of any kind, as for example of a cellulose lacquer or of a varnish, without any troublesome effects whatever. Neither an undesirable long retention of the solvent of the lacquer nor a cracking off of the lacquer coating takes place, such as is often the case if articles impregnated with vegetable, animal or mineral waxes alone be coated with a lacquer as for example by spraying thereon a nitrocellulose lacquer.

The following examples will further illustrate the nature of this invention, but the invention is not restricted to these examples. The parts are by weight.

*Example 1*

Wooden boards are treated for 1 hour under a pressure of 100 atmospheres in a pressure apparatus with a 4 per cent aqueous solution of a wax-like polymerization product of ethylene oxide having a melting point of 52° C. The wood thus impregnated, after drying, is softer and can be much more easily cut than the untreated wood. Besides this the boards thus impregnated may be covered with a commercial nitrocellulose lacquer which strongly adheres to the board in contrast to board impregnated with paraffin wax.

*Example 2*

By treating leather, as for example chrome-tanned calf leather, for 30 minutes with a 20 per cent aqueous solution of a wax-like ethylene oxide polymerization product having a melting point of 50° C., and subsequently drying the leather in the air, a flexible leather is obtained on which a strongly colored nitrocellulose covering lacquer applied by spraying adheres well.

*Example 3*

100 parts of a 30 per cent solution in ethyl alcohol of a soluble condensation product from phenol and formaldehyde which can be hardened, are mixed with 20 parts of a 30 per cent solution of a solid polymerization product of ethylene oxide, having a melting point of 52° C. Paper is then soaked with the aforesaid mixture and heated under pressure, whereby a hard paper showing a high stability on bending is obtained.

*Example 4*

Parchment paper is dipped into a solution of 20 parts of a resinous condensation product from urea and formaldehyde soluble in organic solvents and of 2 parts of a highly viscous polymerization product from 1.2-propylene oxide in 78 parts of commercial ethyl alcohol. After removing the paper from the solution and drying it, an elastic transparent paper is obtained, which may find useful application as a packing material or for the production of transparent windows in envelopes.

*Example 5*

6 parts of a solid water soluble polymerization product from ethylene oxide, having a melting point of about 54° C. are dissolved in 94 parts of water, while adding one or more water-soluble dyestuffs. By suitably selecting the dyestuffs, or mixtures thereof, solutions are obtained, which may find useful application for staining wood. A suitable mixture of dyestuffs may consist for example of 2 parts of Nigrosine WL (Color Index No. 865) and 1 part of Orange II (Color Index No. 151).

*Example 6*

30 parts of a solid wax-like polymerization product from ethylene oxide, having a melting point of about 54° C. are dissolved in a mixture of 50 parts of commercial ethyl alcohol and 20 parts of toluene while slightly warming. After cooling, a paste is obtained which is useful for filling the superficial pores of wooden surfaces, for example of ash wood.

*Example 7*

35 parts of a polymerization product from ethylene oxide, having a melting point of about 54° C. are dissolved in 65 parts of commercial ethyl alcohol while slightly warming, whereupon the solution is mixed with 60 parts of heavy spar. On cooling, a paste is obtained which is rubbed on oak boards with a polishing pad and furnishes an even surface. The boards are then sprayed with a commercial pyroxylin lacquer for application by spraying whereby, after drying, a glossy, smooth and homogeneous coating is obtained which adheres firmly to the boards.

*Example 8*

25 parts of a polymerization product from ethylene oxide, having a melting point of about 54° C. and 3 parts of an oily viscous polymerization product from 1.2-propylene oxide are dissolved in 70 parts of commercial ethyl alcohol whereupon the solution is mixed with 60 parts of heavy spar. The primer thus obtained can be applied as described in Example 7.

What we claim is:—

1. A solid article having a smooth surface and comprising a cellulosic body normally having a surface containing a plurality of indentations and a filling for said indentations comprising a viscoid polymerization product of an alkylene oxide.

2. A solid article comprising a cellulosic body impregnated with a viscoid polymerization product of an alkylene oxide.

3. A solid article having a smooth surface and comprising a cellulosic body normally having a surface containing a plurality of indentations, said body being impregnated with a viscoid polymerization product of an alkylene oxide and said indentations being filled with said polymerization product.

4. A solid article having a smooth surface and comprising an organic fibrous body normally having a surface containing a plurality of interstices, said body being impregnated with a viscoid polymerization product of an alkylene oxide and said interstices being filled with said polymerization product.

5. A solid article having a smooth surface and comprising a cellulosic body normally having a surface containing a plurality of indentations and a filling for said indentations comprising a viscoid polymerization product of ethylene oxide.

6. A solid article comprising a cellulosic body impregnated with a viscoid polymerization product of ethylene oxide.

7. A solid article having a smooth surface and comprising a cellulosic body normally having a surface containing a plurality of indentations, said body being impregnated with a viscoid polymerization product of ethylene oxide and said indentations being filled with said polymerization product.

8. A solid article having a smooth surface and comprising an organic fibrous body normally having a surface containing a plurality of interstices, said body being impregnated with a viscoid polymerization product of ethylene oxide and said interstices being filled with said polymerization product.

9. Wood impregnated with a viscoid polymerization product of an alkylene oxide.

10. Wood impregnated with a viscoid polymerization product of ethylene oxide.

11. A solid article having a smooth surface and comprising leather normally having a surface containing a plurality of interstices and a filling for said interstices comprising a viscoid polymerization product of an alkylene oxide.

12. Paper impregnated with a viscoid polymerization product of an alkylene oxide.

LEO KOLLEK.
WILHELM ENGELS.